United States Patent [19]

Lee

[11] Patent Number: 4,763,817
[45] Date of Patent: Aug. 16, 1988

[54] MEASURED QUANTITY DISPENSER

[76] Inventor: Sang W. Lee, 102 W. Pembrey Dr., Wilmington, Del. 19803

[21] Appl. No.: 236

[22] Filed: Jan. 2, 1987

[51] Int. Cl.$^4$ .............................................. B65D 37/00
[52] U.S. Cl. .................................. 222/207; 222/211; 222/212
[58] Field of Search ............... 222/207, 211, 464, 487, 222/484, 443, 456, 547, 206, 212; 239/327, 354

[56] References Cited

U.S. PATENT DOCUMENTS

| 890,018 | 6/1908 | Burt | 222/456 X |
|---|---|---|---|
| 2,989,216 | 6/1961 | Moro-Lin | 222/211 X |
| 3,178,081 | 4/1965 | Adams | 222/211 X |
| 3,363,808 | 1/1968 | Gorman | 222/211 X |
| 3,381,860 | 5/1968 | Armour | 222/211 |
| 3,628,700 | 12/1971 | Donoghue | 222/211 X |
| 4,091,966 | 5/1978 | Laauwe | 222/211 |
| 4,106,673 | 8/1978 | Donoghue | 222/211 X |
| 4,261,488 | 4/1981 | Bennett | 222/211 X |
| 4,474,312 | 10/1984 | Donoghue | 222/207 X |
| 4,596,341 | 6/1986 | Bruffey | 222/547 X |

Primary Examiner—Charles A. Marmor
Attorney, Agent, or Firm—Stephen F. K. Yee

[57] ABSTRACT

An apparatus is disclosed for dispensing a fixed quantity of material, having a flexible container for holding the material and an assembly rotatably disposed within the container for measuring and dispensing the material when the container is squeezed. The assembly includes a measuring cup extending adjacent to the bottom of the container and having an opening for entry of the material, an air chamber disposed adjacent to the mouth of the container and formed with a nozzle for discharge of the material, and a tube connecting the cup and chamber. Openings are spaced around the periphery of the air chamber, and the container neck adjacent to the chamber is provided with a plurality of protrusions which can, by rotation of the assembly relative to the container, be selectively positioned adjacent to the openings in the air chamber to block the openings and prevent air flow therethrough. The dispenser is inverted and squeezed to dispense the quantity of material in the measuring cup and, after the container is uprighted, the openings are unblocked to refill the measuring cup. The assembly is removable to permit refilling of the container.

17 Claims, 2 Drawing Sheets

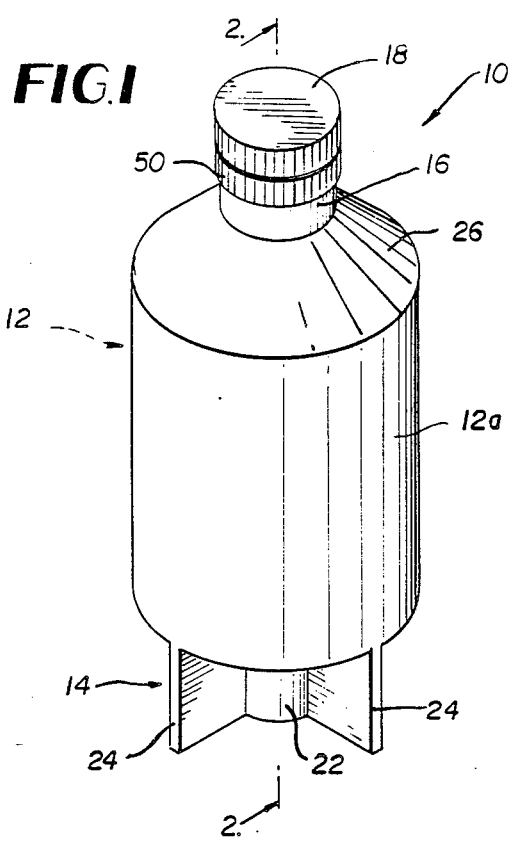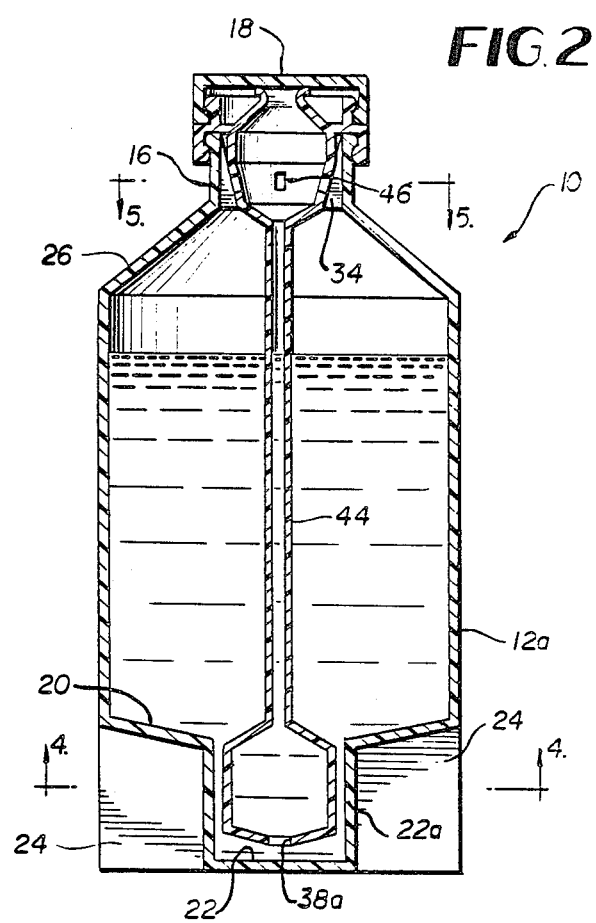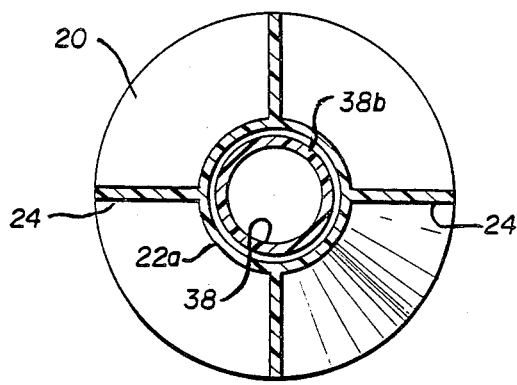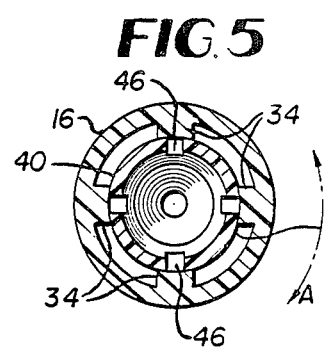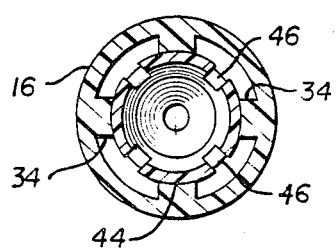

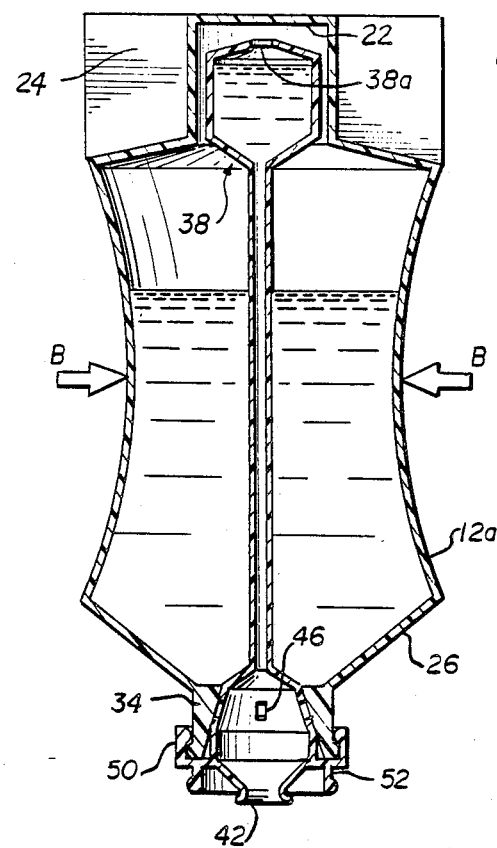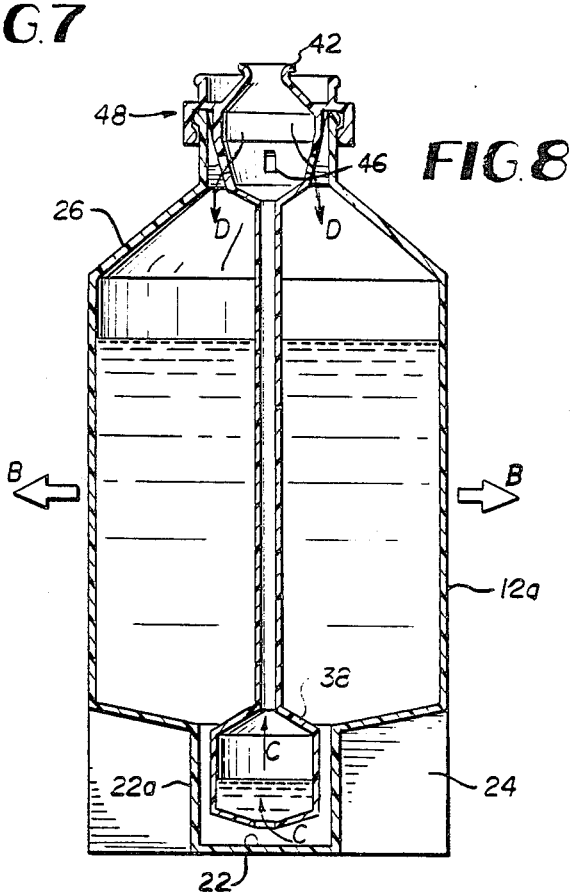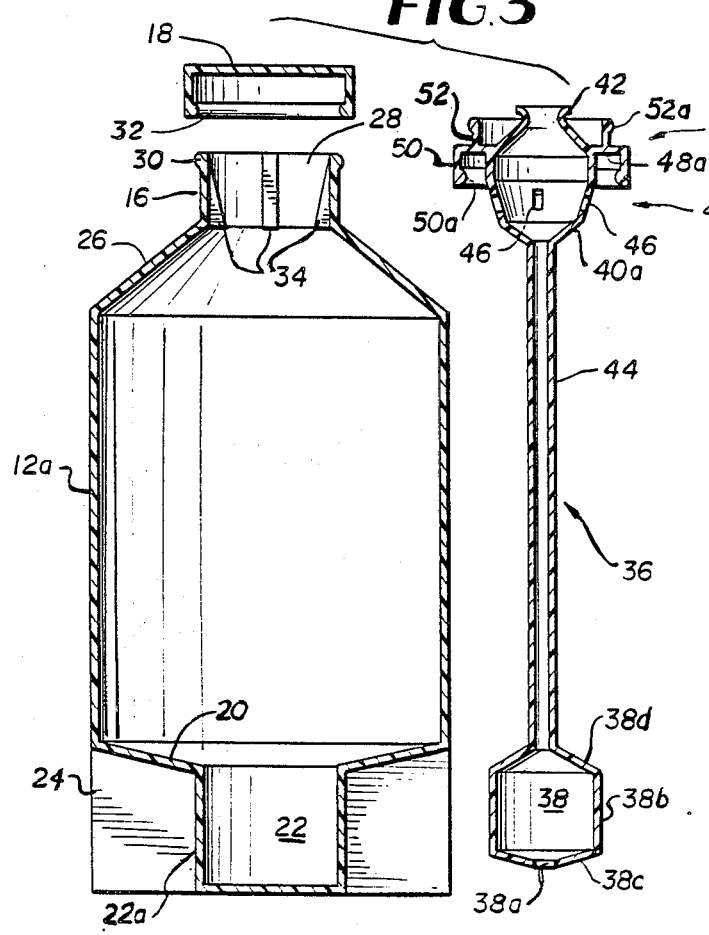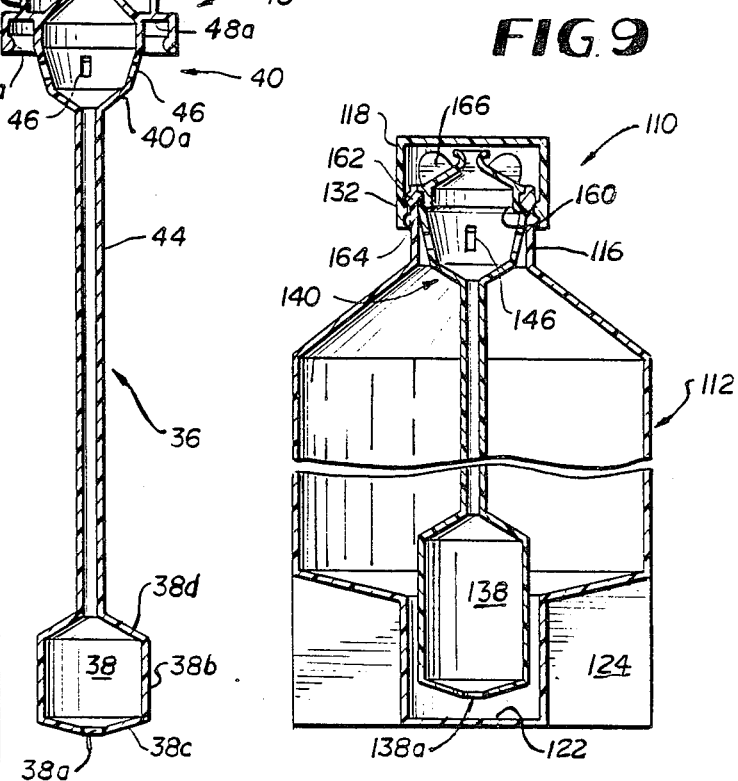

MEASURED QUANTITY DISPENSER

BACKGROUND OF THE INVENTION

1. Field of the Invention

This invention relates generally to dispensers and, more particularly, to a squeeze-type dispenser for dispensing a predetermined quantity of the contents.

2. Description of the Prior Art

Dispensers for dispensing a measured or predetermined quantity are known in the art, and include containers which are rigid and flexible, or squeezeable. When these dispensers are inverted or squeezed, a fixed quantity of the contents is dispended from the container. Returning the container to its upright position, or releasing the flexible container, resets the dispenser for the next use.

Examples of dispensers which use a flexible or squeeze-type container are described in the following U.S. Pat. Nos.:

U.S. Pat. No. 2,989,216, Moro-Lin
U.S. Pat. No. 3,636,808, Gorman
U.S. Pat. No. 3,628,700, Donoghue
U.S. Pat. No. 4,106,673, Donoghue
U.S. Pat. No. 4,261,488, Bennett For various reasons, these prior-art dispensers have shortcomings. Moro-lin and Donoghue ('700), for instance, use containers which are sealed after being filled with the contents; the containers are not refillable. Gorman's device produces a spray or mist, and the metering apparatus does not consistently provide an accurately-measured quantity each time it is squeezed. The apparatus of Donoghue ('673) includes a cup for receiving the dispensed liquid, but does not provide means for dispensing an accurately-measured quantity of the liquid.

SUMMARY OF THE INVENTION

Accordingly, among the objects of the present invention are to provide: an improved dispenser of the squeeze-type container which consistently dispenses an accurately-measured, predetermined quantity of the contents; and improved dispenser of the foregoing type which is refillable, and which will dispense substantially all of the contents; an improved dispenser of the foregoing type which is easy to use and does not result in messy dripping of the contents; and a dispenser of the foregoing type having improved pressure equalizing control means to provide accurate measurement of the contents to be dispensed.

These and other objects of the invention are achieved in a dispenser having a flexible, squeeze-type container for holding the contents and a measuring-and-delivery assembly rotatably disposed within the container. The assembly includes a measuring cup extending adjacent to the bottom of the container and having an opening for entry of the contents, and an air chamber disposed adjacent to the mouth of the container and formed with a nozzle for discharge of the contents, with a tube joining the cup to the chamber. Openings are spaced around the periphery of the air chamber, and the region of the container adjacent to the chamber is provided with a plurality of radial tabs or protrusions which, by rotation of the assembly relative to the container, can be selectively positioned adjacent to the openings in the air chamber to block the openings and prevent air flow therethrough. After blocking the openings, the dispenser can be inverted and squeezed to dispense the quantity of contents in the measuring cup.

A better understanding and appreciation of the foregoing description, as well as other objects, features and advantages of the invention can be obtained from the following description of presently-preferred embodiments, when considered in conjunction with the accompanying drawings.

BRIEF DESCRIPTION OF THE DRAWINGS

FIG. 1 is a perspective view of the dispenser of the present invention.

FIG. 2 is an elevational, sectional view of the dispenser, as seen along line 2—2 in FIG. 1.

FIG. 3 is an exploded view, showing the components of the dispenser in elevational section.

FIG. 4 is a cross-sectional view of the dispenser, as seen along line 4—4 in FIG. 2.

FIG. 5 is a cross-sectional view of the dispenser, as seen along line 5—5 in FIG. 2.

FIG. 6 is a view similar to FIG. 5, showing another stage in the operation of the dispenser.

FIGS. 7 and 8 are elevational, sectional views of the dispenser, illustrating the dispensing of the contents and refilling for the next dispensing.

FIG. 9 is a elevational, sectional view similar to FIG. 2, showing an alternate embodiment of the dispenser.

DETAILED DESCRIPTION OF THE PREFERRED EMBODIMENTS

Referring now to the drawings, wherein the same or similar reference numerals designate the same or similar elements throughout the several views, FIG. 1 shows the assembled dispenser 10 of the present invention, which includes a container 12 having at least a sidewall 12a of flexible material, a base 14 and a neck 16 closed by a cap or cover 18. As shown in FIGS. 2 and 3, base 14 of container 12 has a downwardly-sloped bottom surface 20 terminating in a centrally-dsposed well 22 with a vertical, cylindrical wall 22a. Supports or legs 24 are provided on base 14 to support the dispenser in a stable, upright position.

The upper portion of container 12 includes a conically-shaped top 26 terminating in the cylindrical neck 16 and a mouth 28. A radial ridge or rim 30 extends circumferentially around the exterior edge of mouth 28, and cooperates with a similarly-configured peripheral bead 32 located adjacent to the open edge of cap 18 to permit the cap to be snapped over the mouth to close container 12. Spaced around the inner surface of container neck 16 are a plurality of flat-faced protrusions or tabs 34 which extend downwardly and inwardly along the height of the neck. Tab 34 may have a substantially triangular configuration in elevational section, and a substantially rectangular horizontal cross section (FIGS. 5 and 6).

An assembly 36 for measuring a predetermined quantity of material and delivering it from container 12 is shown in FIG. 3 removed from the container. Assembly 36 includes a hollow measuring cup 38 having an entry 38a at one end, and an air chamber 40 with a nozzle 42. A hollow tube 44 connects measuring cup 38 and air chamber 40 to provide fluid communication between these elements. Assembly 36 may conveniently be formed as an integral unit, as shown in the drawings, or may be formed from separate cup, tube and chamber elements joined to form a substantially fluid-tight connection between these elements.

As shown in the drawings, measuring cup 38 has a cylindrical sidewall 38b, an inwardly and downwardly tapered lower surface 38c through which entry 38a extends, and a conically-shaped upper surface 38d which merges into the lower end of tube 44. Sidewall 40a of air chamber 40 is formed as a series of truncated frustoconical sections joined together, and a plurality of holes 46 penetrate the sidewall of the air chamber, peripherally spaced at a location slightly above the juncture of the upper portion of tube 44 with the air chamber, such as shown in FIG. 3. The planar surfaces of the air chamber sidewall cooperate with the flat face of tabs 34 to provide a relatively fluid-tight interface to prevent leakage through the holes 46 when they are positioned adjacent to the tabs, as described more fully below.

Air chamber 40 is provided with a dual-diameter twist cap, or container closure 48, having a stepped configuration in elevational section and attached to the air chamber by an annular flange 48a. Twist cap 48 has a lower portion formed by a cylindrical section 50 extending downwardly from flange 48a and an upper portion formed by a second cylindrical section 52 extending upwardly from the flange, the diameter of the lower portion being larger than the upper portion. As shown most clearly in FIG. 3, cylindrical section 50 has a bear or ridge 50a extending along the inner circumference of the open, lower edge of the section, and a similar bead or ridge 52a extends along the exterior periphery of upper, open end of the second cylindrical section 52. The upper and lower portions of twist cap 48 are sized such that when assembly 36 is placed within container 12, lower cylindrical section 50 snaps over the mouth 28 of the container, with the bead 50a frictionally slipping over the bead 30 on the container mouth, and the cap 18 then snaps over the bead 52a on the upper section 52 of the twist cap, to close dispenser 10.

As shown in FIG. 2, when assembly 36 is inserted into container 12 and snapped over mouth 28, measuring cup 38 extends into well 22, with a clearance between the cylindrical, exterior surface of the cup and the inner surface of the well to permit flow of the contents of the container into the measuring cup via entry 38a. The length of tube 44 is selected to suspend the lower end surface 38c of measuring cup 38 above the floor of well 22 to provide easy entry of the contents into the cup. The longitudinal dimension of air chamber 40 is selected such that the chamber is substantially coextensive with neck 16 of container 12.

While assembly 36 fits snugly over the neck and mouth of container 12, it may still be rotated relative to the container by turning twist cap 48. Turning if facilitated by roughening the exterior surface of twist cap 48, such as with ribs or ridges of small raidial height, extending vertically on the surface, as shown in FIG. 1.

With the orientation shown most clearly in FIG. 2, it can be appreciated that by turning twist cap 48, air chamber 40 may be rotated to either place openings 46 in alignment with tabs 34, as shown in FIG. 5, thereby blocking the openings to prevent flow of air or other fluid therethrough. Further turning of twist cap 48 in either direction (arrow A) rotates openings 46 out of alignment with tabs 34, as shown in FIG. 6, thereby permitting flow through the openings.

With assembly 36 removed from container 12, the material to be dispensed is charged into the container, to a suitable height to leave an air space above the level of the material (FIG. 2). Assembly 36 is installed in container 12 by placing the measuring cup 38 into well 22 and snapping twist cap 48 over mouth 28 of the container. Pressure from the weight of the material forces some of the material through entry 38a in the bottom of the measuring cup 38 (arrow C, FIG. 8), to fill the cup and tube 44, up to a level substantially equal to the height of the material in container 12. Closure cap 18 is snapped over nozzle 42 and upper section 52 of twist cap 48 to preclude entry of foreign matter into air chamber 40. As shown in the condition of FIG. 2, dispenser 10 is ready for use.

In use, cap 18 is removed from dispenser 10, and if openings 46 are not blocked by tabs 34 (FIG. 5), twist cap 48 on air chamber 40 is rotated to achieve this blockage configuration. Dispenser 10 is then inverted, and in the position shown in FIG. 7, measuring cup 38 is filled with the material to be dispensed. Squeezing sidewall 12a in the direction indicated by arrows B applies positive pressure to the air space in the container 12, above the level of the material therein, to force the material in the measuring cup 38 down through the delivery tube 44 and into air chamber 40, from which the material is discharged through nozzle 42. Blockage of openings 46 by tabs 34 prevents material flow through the sidewall of air chamber 40, which would affect the quantity of material dispensed. After the contents of measuring cup 38 has been completely discharged, indicated by the discharge of air from nozzle 42, dispenser 10 is turned upright and twist cap 48 on air chamber 40 is rotated to unblock openings 46, as shown in FIG. 6.

Releasing pressure on sidewall 12a permits the flexible sidewall to return to its normal configuration, in the direction of arrows B in FIG. 8, thus creating a negative pressure condition within container 12. Air is drawn into air chamber 40 through nozzle 42, and into container 12 through openings 46, into the space above the container contents, as shown by arrows D in FIG. 8. The resulting atmospheric pressure on the free surface of the contents, plus the weight of the contents, causes the material to enter measuring cup 38 through entry 38a (arrows C, FIG. 8), filling the measuring cup and tube 44, up to the level of the contents in container 12. Dispenser 10 is again ready for use.

The amount of material dispensed each time may vary slightly due to different levels of the remaining material inside the container and the delivery tube. To minimize this variation, the inside diameter of the tube is made very small, thus reducing the volume of material within the tube. The tube diameter can be sized such that the variation is acceptable even when dispensing liquid which requires more accurate volume control, such as medicine, etc. As a comparison, dispensing medicine by a teaspoon (5,000 mm$^3$) can vary as much as 1.4%.

In addition to discharging the contents and controlling air flow into the container for quick, accurate refilling of the measuring cup, the air chamber also seves as a reservoir. Since the diameter of the delivery tube is very small, as noted above, even the slightest squeeze of the container in the upright position may result in an accidental discharge of the material through the nozzle, creating an undesirable situation, if other provisions are not made. The air chamber, being in fluid communication with the delivery tube, acts as a reservoir to receive the material accidentally squeezed from the tube when the dispenser is upright, and thus prevents the accidental discharge of material from the dispenser.

An alternate embodiment of dispenser 10, denoted by 100-series numerals, is shown in FIG. 9. Dispenser 110 is identical to dispenser 10 described above, except the configuration of air chamber 140 has been changed and the upper region of the container neck and mouth have been modified to accept the new air chamber. Instead of having a twist cap 48 arrangement as in dispenser 10, the exterior surface of the sidewall of air chamber 140 is provided with an annular groove 160 for receiving a peripheral bead 162 disposed on mouth 128 of a container 112. Bead 162 is disposed medially with respect to the material thickness of container neck 116. That is, a portion of bead 162 extends radially inwardly of mouth 128 and a portion extends radially outwardly. Located slightly below bead 162 is another annular bead or ridge 164 on the exterior surface of container neck 116. The longitudinal spacing of beads 162 and 164 is sufficient to snugly receive the peripheral ring 132 on the inner surface of the open end of cap 118, which is similar to cap 18 except that cap 118 is deeper to receive the modified air chamber 140.

The upper, exterior surface of air chamber 140 is provided with flat, planar tabs or wings 166 to permit rotation of assembly 136 relative to container 112, in the manner described above for dispenser 10, and to facilitate removal of the assembly from the container to permit filling thereof. It is apparent that by applying a twsiting force to wings 166, assembly 136 is rotated to block or unblock openings 146 in air chamber 140, in the manner described above. In all other respects, the structure, arrangement and operation of dispenser 110 is identical to dispenser 10.

The combination of the downwardly inclined bottom surface of the container, the well extending below the elevation of the bottom surface, and the positioning of the measuring cup into the well, almost to the bottom thereof, with the entry located in the lower surface of th emeasuring cup, permits substantially all the contents in the container to be dispensed, thus reducing waste and the necessity for frequent refilling of the container.

The size of the container, measuring and discharging assembly, diameter of the delivery tube, nozzle size, and other components of the dispenser are appropriately sized for the material to be dispsnsed. While liquids may be ideally dispensed with the present invention, other materials such as powder and fine granules, also may be dispensed.

Although the dispenser may be made of any suitable material, it may conveniently be molded from a plastic material such as polypropylene. Various modifications may be made. For example, instead of separate supports or legs being used at the base of the container, a solid base may be provided. Rather than using snap-type attachment means for the closure cap, twist cap and the cotnainer neck, other types of attachment may be used. Screw thread attachments, for example, may be used, and would be appropriate for the closure cap on the alternate embodiment of FIG. 9.

Although preferred embodiments of the present invention have been described, and modifications considered, it is to be understood that further modifications and variations may be made by those skilled in the art without departing from the spirit of the invention, and such modifications and variations are considered to be within the purview and scope of the invention as defined by the appended claims.

What is claimed is:

1. An apparatus for dispensing a predetermined quantity of material, comprising:
   a container having a flexible sidewall portion and a neck portion extending upwardly from the container and having an opening for receiving the material;
   an assembly for measuring a predetermined quantity of material and discharging the material when the flexible sidewall portion of the container is squeezed, the assembly being receivable within the container and including:
   measuring means for containing a predetermined quantity of material and having an orifice for entry of the material from the container;
   a chamber having an outlet for discharging the predetermined quantity of material from the container;
   at least one opening in the chamber for fluid communication between the interior of the chamber and the interior of the container; and
   a tube interconnecting and providing fluid communication between the measuring means and the chamber to permit delivery of the predetermined quantity of material from the measuring means to the chamber;
   means on the neck portion of the container selectively positionable against the opening the chamber to block the opening to prevent air flow through the opening, and away from the opening to permit air flow through the opening, the blocking and unblocking of the opening controlling air flow into the interior of the container to regulate refilling of the measuring means; and
   means for rotatably and removably supporting the assembly on the container neck portion.

2. Apparatus as defined in claim 1, wherein said support means comprises:
   attachment means on the neck portion of the container; and
   securing means on the chamber cooperating with the attachment means on the container neck for rotatably supporting the assembly on the container to permit rotation of the assembly relative to the container.

3. An apparatus as defined in claim 2, wherein the support means permits selective rotation of the assembly to position the blocking means adjacent to the chamber opening to block the opening, and away from the chamber opening to unblock the opening.

4. An apparatus as defined in claim 3, wherein the blocking means includes at least one element protruding radially inwardly from the container neck portion.

5. An apparatus as defined in claim 4, wherein the chamber has a plurality of openings spaced along a circumferential surface and the blocking means includes a plurality of radially protruding elements.

6. An apparatus as defined in claim 1, wherein the container has a portion of the bottom surface, opposite from the neck portion, recessed below the elevation of the bottom surface to define a well for receiving the measuring means.

7. An apparatus as defined in claim 6, wherein the support means permits selective rotation of the assembly to position the blocking means adjacent to the chamber opening to block the opening, and away from the chamber opening to unblock the opening.

8. An apparatus as defined in claim 7, wherein the blocking means includes at least one element protruding radially inwardly from the container neck portion.

9. An apparatus as defined in claim 8, wherein the chamber has a plurality of openings spaced along a circumferential surface and the blocking means includes a plurality of radially protruding elements.

10. An apparatus as defined in claim 9, wherient eh container further has a base for stably supporting the container in an upright position.

11. An apparatus as defined in claim 10, further comprising a cover fitting over the chamber outlet to close the container.

12. A dispenser for dispensing a predetermined quantity of material when the dispenser is inverted and squeezed, comprising:
- a container having a flexible sidewall portion and a neck portion extending upwardly from the container and having an opening for receiving the material;
- a device for measuring a predetermined quantity of material and discharging the material when the flexible sidewall portion of the container is squeezed, the device being receivable within the container and including:
  - measuring means for containing a predetermined quantity of material and having an orifice for entry of the material from the container;
  - a chamber having an outlet for discharging the predetermined quantity of material from the container;
  - at least one opening in the chamber for fluid communication between the interior of the chamber and the interior of the container; and
  - a delivery tube interconnecting and providing fluid communication between the measuring means and the chamber to permit delivery of the predetermined quantity of material from the measuring means to the chamber;
- means on the neck portion of the container selectively positionable against the opening in the chamber to block the opening to prevent air flow through the opening, and away from the opening to permit air flow through the opening, the blocking and unblocking of the opening controlling air flow into the interior of the container to regulate refilling of the measuring means; and
- means for rotatably and removably supporting the device on the container neck portion, including:
  - attachment means on the neck portion, and
  - securing means on the chamber which coact with the attachment means to rotatably support the assembly on the container to permit rotation of the device relative to the container, and to permit removal of the device, wherein the support means permits selective rotation of the device to position the blocking means adjacent to the chamber opening to block the opening, and away from the chamber opening to unblock the opening.

13. A dispenser as defined in claim 12, wherein the blocking means includes at least one element protruding radially inwardly from the container neck portion.

14. A dispenser as defined in claim 13, wherein the chamber has a plurality of openings spaced along a circumferential surface and the blocking means includes a plurality of radially protruding elements.

15. A dispenser as defined in claim 14, wherein the container has a portion of the bottom surface, opposite from the neck portion, recessed below the elevation of the bottom surface to define a well for receiving the measuring means.

16. A dispenser as defined in claim 15, further comprising a cover fitting over the chamber outlet to close the container, and the container bottom exterior surface has a plurality of radial support elements to stably support the dispenser in an upright position.

17. A dispenser as defined in claim 16, wherein the chamber has a pair of upstanding planar element adjacent to the outlet to receive a torque to rotate the assembly relative to the container.

* * * * *